US006476723B1

(12) United States Patent
Campbell et al.

(10) Patent No.: US 6,476,723 B1
(45) Date of Patent: Nov. 5, 2002

(54) INSULATING OIL LEAK CONTAINMENT (75) Inventors: David C. Campbell, Knoxville, TN (US); David McMahan Butler, Knoxville, TN (US); Johnny James Clark, Lenoir City, TN (US)

(73) Assignee: Filmax, Inc., Loudon, TN (US)

( * ) Notice: Subject to any disclaimer, the term of this patent is extended or adjusted under 35 U.S.C. 154(b) by 0 days.

(21) Appl. No.: 08/692,567

(22) Filed: Aug. 6, 1996

(Under 37 CFR 1.47)

Related U.S. Application Data (63) Continuation of application No. 08/400,985, filed on Mar. 8, 1995, now abandoned.

(51) Int. Cl.[7] .............................................. G08B 21/00
(52) U.S. Cl. ........................ 340/605; 340/603; 340/616; 73/40
(58) Field of Search ................................ 340/605, 646, 340/626, 603, 616; 174/14 R; 210/87; 73/40

(56) References Cited

U.S. PATENT DOCUMENTS

| | | | |
|---|---|---|---|
| 2,340,898 A | 2/1944 | Race ........................ 174/14 R |
| 3,087,431 A | 4/1963 | Bagwell ........................ 417/9 |
| 3,371,299 A | 2/1968 | Radkowski et al. ........... 336/57 |
| 4,232,551 A | 11/1980 | Pierce ........................ 368/73 |
| 4,337,820 A | 7/1982 | Pierce ........................ 165/11.1 |
| 4,424,502 A | * 1/1984 | Kullinger et al. .......... 174/14 R |
| 4,437,082 A | 3/1984 | Walsh et al. |
| 5,229,745 A | * 7/1993 | Koide et al. ................. 340/626 |
| 5,244,567 A | 9/1993 | Gerteis ........................ 210/86 |
| 5,360,033 A | 11/1994 | Williams et al. ............. 137/565 |
| 5,565,094 A | * 10/1996 | Zoch et al. .................... 210/87 |
| 5,656,999 A | * 8/1997 | Campbell .................... 340/605 |
| 5,691,706 A | * 11/1997 | Butler et al. ................. 340/646 |

OTHER PUBLICATIONS

Thomas Products, Ltd., *Level & Flow Switches*, Copyright© 1994 Thomas Products, Ltd.
*Turck Capacitive Sensors*, pp. D31, D32, D9 & D10: Turck, Inc., 3000 Campus Drive, MinNeapolis, MN 55441.
Turck, Inc., *Inductive Proximity Sensors Specialized Sensors & Interface Devices Intrinsically—Safe Sensors & Interface Devices*, 3000 Campus Drive, Minneapolis, MN 55441.
*Intelligent Sensing*, Proximity Sensor For Presence, Position, Mass & Moisture; CASI, Computer Application Systems, Inc., 100 Cherokee Blvd., Suite 322, Chattanooga, TN 37405.
*Oil-Alert*, Detect Small Leaks: Dorlen Products, InC., 6615 West Layton Avenue, Milwaukee, WI 53220.
*Solid State Thermally Actuated Flow Switch/Monitor*, E–T–A® Control Instruments, 1551 Bishop Court, Mt. Prospect, Il 60056.
*Optical Liquid Level Sensor*. Model LV170; Unknown Manufacturer.
*High–Level Alarm*, Kinematics & Controls Corporation, 14 Burt Drive, Deer Park, NY 11729–5702.

(List continued on next page.)

*Primary Examiner*—John Tweel
(74) *Attorney, Agent, or Firm*—W. Allen Marcontell (57) ABSTRACT

Insulating oil in electric power transmission devices such as a transformer is filtered for removal of accumulated water and carbon particles. The filter and circulation pump are usually located in a separate cabinet external to the transformer with circulation conduits connecting the filter, the pump and the transformer. To prevent environmental contamination by leaks or ruptures in the oil circulation conduits, secondary or sleeving conduits surround and protect the circulation conduits and additionally provide an independent leak flow conduit back to the filter cabinet dry sump. An accumulation of oil in the dry sump actuates a fluid sensor to transmit an alarm signal.

39 Claims, 4 Drawing Sheets

OTHER PUBLICATIONS

*Liquid Level Controllers*, Microprocessor Based; Kinematics & Controls Corporation, 14 Burt Drive, Deer Park, NY 11729–5702.

*Installation Outline Drawings*; Kinematics & Controls Corporation, 14 Burk Drive, Deer Park, NY 11729–5702.

*Liquid Level Sensors*, TRP Series, Kinematics & Controls Corporation, 5125 Series, 14 Burt Drive, Deer Park, NY 11729–5702.

*Liquid Level Sensors*, 5136 Series; Kinematics & Controls Corporation, 14 Burt Drive, Deer Park, NY 11729–5702.

*Liquid Level Sensors*, 5092 Series; Kinematics & Controls Corporation, 14 Burt Drive, Deer Park, NY 11729–5702.

*Fiber–Optic Liquid Level Sensors*, Series 5050, Kinematics & Controls Corporation, 14 Burt Drive, Deer Park, NY 11729–5702.

*Discriminating Liquid Sensor for Interstitial Applications*, IMO Industries, Inc.; GEMS Environmental Products, One Cowles Road, Plainville, CT 06062.

*Hydrostatic Reservoir Sensors*, IMO Industries, Inc.; GEMS Environmental Products, Gems Sensors Division, One Cowles Road, Plainville, CT 06062.

*High Level Indicator*, IMO Industries, Inc.; GEMS Environmental Products, Gems Sensors Division, One Cowles Road, Plainville, CT 06062.

*Groundwater Sensor*, IMO Industries, Inc.; GEMS Environmental Products, Gems Sensors Division, One Cowles Road, Plainville, CT 06062.

*Smartwell: Portable System for Groundwater Monitoring*, IMO Industries, Inc.; GEMS Environmental Products, Gems Sensors Division, One Cowles Road, Plainville, CT 06062.

*The Universal Liquid Level Sensor*, IMO Industries, Inc.; GEMS Environmental Products, Gems Sensors Division, One Cowles Road, Plainville, CT 06062.

*Discriminating Containment Sump Sensor*, IMO Industries, Inc.; GEMS Environmental Products, Gems Sensors Division, One Cowles Road, Plainville, CT 06062.

*The Bracketed Liquid Level Sensor*, IMO Industries, Inc.; GEMS Environmental Products, Gems Sensors Division, One Cowles Road, Plainville, CT 06062.

*Dispenser Shutdown Retrofit Assembly*, IMO Industries, Inc.; GEMS Environmental Products, Gems Sensors Division, One Cowles Road, Plainville, CT 06062.

*Self–Checking High Level Indicator*, IMO Industries, Inc.; GEMS Environmental Products, Gems Sensors Division, One Cowles Road, Plainville, CT 06062.

*Interstitial, Electro–Optic Liquid Sensor*, IMO Industries, Inc.; GEMS Environmental Products, Current Loop Output, Gems Sensors Division, One Cowles Road, Plainville, CT 06062.

*Interstitial Liquid Sensor*, IMO Industries, Inc.; GEMS Environmental Products, Gems Sensors Division, One Cowles Road, Plainville, CT 06062.

*Interstitial, Electro–Optic Liquid Sensor*, IMO Industries, Inc.; GEMS Environmental Products, Gems Sensors Division, One Cowles Road, Plainville, CT 06062.

*Discriminating Liquid Sensor for Interstitial Applications: Current Loop Output*, IMO Industries, Inc.; GEMS Environmental Products, Gems Sensors Division, One Cowles Road, Plainville, CT 06062.

GEMS ProductS for AST Leak Detection.

GEMS Products for UST Leak Detection.

*Leak Detection Sensors*, IMO Industries, Inc.; GEMS Environmental Products, Gems Sensors Division, One Cowles Road, Plainville, CT 06062.

* cited by examiner

INSULATING OIL LEAK CONTAINMENT

RELATED APPLICATION

The present invention is a continuation of presently copending application Ser. No. 08/400,985 filed Mar. 8, 1996, now abandoned.

BACKGROUND OF THE INVENTION

The present invention generally relates to electric power transmission devices. More particularly, the invention relates to apparatus and methods for preventing environmental contamination by dielectric insulation oil.

Electric power transmission devices such as transformers and switch gear are often immersed in a specially compounded oil with dielectric properties for purposes of insulation, isolation and cooling. On occasion, these devices generate extremely high operating temperatures. Although the oil will not burn in the absence of atmosphere or oxygen, small portions will directly decompose under the intense heat of electrical arcing into elemental carbon, which remains in the oil body as suspended graphite particles.

Additionally, the chemical nature of the oil is hydrophilic. Any atmospherically carried water coming into surface contact with the oil is adsorbed and entrained.

Both, water droplets and graphite particles are intolerable contaminants of the oil and must be removed, either periodically or continuously. Fortunately, both contaminants are effectively removed by relatively simpler depth wound unsized paper reel filters. A traditional installation often will connect a transformer oil cavity by external plumbing conduits to adjacently housed pump and filter units. Circulation around the conduit loop is driven by the pump motor which is controlled by cycle timers and filter pressure differential monitoring switches. Circulation may be continuous or intermittent, depending on the type of transformer or the service to which it is applied.

An adverse consequence of such dielectric oil is the environmentally hazardous nature of its chemical composition. Consequently, these oils are heavily regulated and monitored. Affected site clean-ups due to leaks and spills are extremely expensive and subject to the responsible manager to fines and other penalties. Accordingly, great care is exercised in handling these fluids and every reasonable precaution is taken to prevent leaks from the external filter circulation system. Nevertheless, leaks can and do occur.

It is, therefore, an object of the present invention to protect the local environment from leaks and other losses of insulating oil from transformer and other electrical power transmission devices.

Another object of the present invention is the provision of an alarm system to alert responsible management of a defective transformer oil circulation system.

A further object of the present invention is provision of a secondary conduit system enclosing the primary insulation oil circulation system for an electric power device.

SUMMARY OF THE INVENTION

These and other objects of the invention are provided by an independent insulating oil circulation system having a motor driven pump connected in fluid circuit with a filter unit. The pump, motor and filter assembly are preferably secured within an independent cabinet enclosure above a normally dry reservoir volume.

The cabinet reservoir volume is guarded by a fluid sensor such as a level switch to indicate the presence of oil within the normally dry reservoir.

Primary circulation conduits connect the filter and pump, respectively, with the oil filled cavity of an associated electric power transmission device such as a transformer, load tap changer, breaker, closure, reclosure, switch or switching bank. A full circulation loop at least includes a conduit from the transmission device oil cavity to the pump, a flow connection between the pump and the filter, a conduit between the filter and the transmission device oil cavity and an internal flow connection within the transmission device oil cavity between the pump conduit connection and the filter conduit connection.

Fluid-tight housings are secured to the external surface of the transmission device casement around respective circulation conduit connectors to or through the casement whereby the point of casement penetration by the connector is enclosed by a secondary containment volume. These housings are of such dimension and volume as to permit hand-tool accessibility through resealable port covers to the circulation conduit connectors.

The circulation conduits enter the secondary containment housing and the isolation cabinet through sealed bulkhead connectors. The bulkhead connectors are continuously interconnected by large conduits for a continuous enclosure therebetween. Accordingly, a sealed and continuous secondary fluid flow channel is established around the primary circulation system with the pump/filter cabinet reservoir, preferably at the elevationally lowest point in the system. Oil escaping from the primary circulation circuit at any point outside of the transmission device case will gravity drain to the cabinet sump volume. Depending on the type of fluid detection system used, when sufficient oil accumulates in the sump, an alarm signal is transmitted to the filter circulation and central control systems to stop the pump drive and seal off the primary circulation circuit from the oil cavity of the transmission device.

BRIEF DESCRIPTION OF DRAWINGS

The advantages and further aspects of the invention will be readily appreciated by those of ordinary skill in the art as the same becomes better understood by reference to the following detailed description when considered in conjunction with the accompanying drawings in which.

DESCRIPTION OF THE PREFERRED EMBODIMENT

Figure 1:
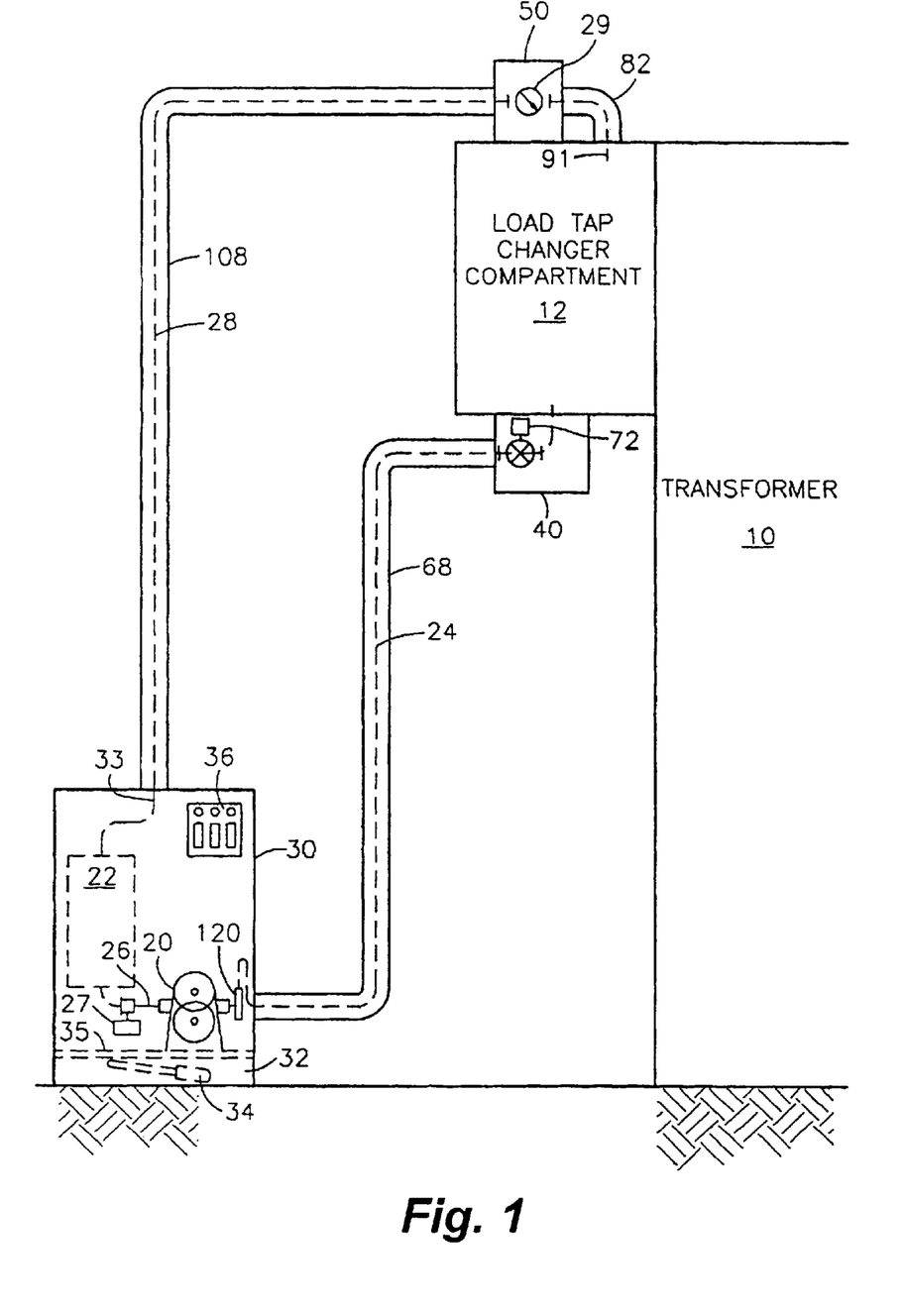
FIG. 1 is a fluid circulation schematic of the present invention.

Relative to the drawings wherein like reference characters designate like or similar elements throughout the several figures of the drawings, FIG. 1 schematically shows a fluid circuit of the invention supporting the load tap changer 12 of an electric power transformer 10. Typically, such a power transformer stands about 10 to 14 ft. high with a nominal diameter or rectangular side dimension of 3 to 6 feet across. The transformer 10 and load tap changer 12 of FIG. 1 are merely representative of many types of electric power transmission devices that further include breakers, closures, reclosures and switches.

Each transformer casement is usually externally finned for heat dissipation and sealed to prevent loss and leakage of internal fluids which immerse a plurality of core and winding assemblies. The internal fluid is an oil substance, not necessarily petroleum based, but moderately viscous and highly dielectric to insulate the several winding sets from arcing between themselves and the transformer case. Localized heating of the oil stimulates internal convective circulation which transfers the heat generated by electrical transform losses to the outer case for conduction therethrough to the exterior dissipation fins. Pumps and radiators may also be used to cool the insulating oil.

The load tap changer is a mechanical switching array by which the transformer output is regulated for line demand. The electrical arcing usually incident to the closure and opening of charged electrical contacts is a momentary point source of extreme heat if not vacuum isolated. Such extreme heat on the presence of the insulating oil generates particulate graphite from a dissociation of the oil. Such particulate graphite becomes a contaminant in the oil body and contributes to a reduction of the dielectric property of the oil. For reasons which amount to a greater propensity for contaminant generation, a load tap changer oil cavity of 300 to 800 gallons capacity is frequently isolated from the oil cavity respective to the transformer winding case. Breakers, closures, reclosures and switch boxes may encase 50 gal. to 200 gal. of dielectric insulating oil.

Typically, the transformer or load tap changer insulating oil is circulated by a pump 20 through a filtration unit 22. Section conduit 24 provides a fluid flow channel between the bottom of the load tap changer oil cavity (FIG. 4) and the pump 20 suction connection. Pump discharge conduit 26 connects to the inlet of filter 22. Return conduit 28 carries the oil circulation flow loop back to load tap changer (FIG. 3) 12.

The pump 20 and its associated electric motor 21 (FIG. 2), the filter 22 and the related electric control panel 36 are housed within a cabinet enclosure 30 which is generally located closely adjacent to the transfer load changer 12 and elevationally below the conduit 24 and 28 connection points with the load tap changer.

Also within the enclosure 30, preferably at an elevational point below the enclosure penetration points 31 and 33, is a normally dry oil sump reservoir 32. A perforated cabinet floor 35 preferably, but not necessarily, separates the upper volume of the cabinet enclosure from the lower reservoir volume 32. Fluid presence within the reservoir 32 is monitored by a level sensor 34 shown to be a float switch. It should be understood that no particular volume of oil is required in reservoir 32 for effecting a signal from the sensor 34. Accordingly, any of numerous sensor types may be used equivalently in this application. For example, a dielectric sensor which measures the dielectric strength of a fluid covering the sensor surface would signal not only the presence of the insulation oil when air over the sensor surface is displaced but also the dielectric condition of the oil contacting the sensor surface. Other sensor types that may be used are ultrasonic sensors that respond to volumetric changes within the reservoir and special sensors that respond to the light color reflected from the reservoir floor.

At each of the load tap changer case penetration points for the primary circulation conduits 24 and 28, connector housings 40 and 50 are provided. Each of housings 40 and 50 are of different style suited for a particular installation circumstance. Depending on the mix of these installation circumstances, either housing type could be used at both locations or other, functionally equivalent, secondary containment housings may be used.

Figure 4:
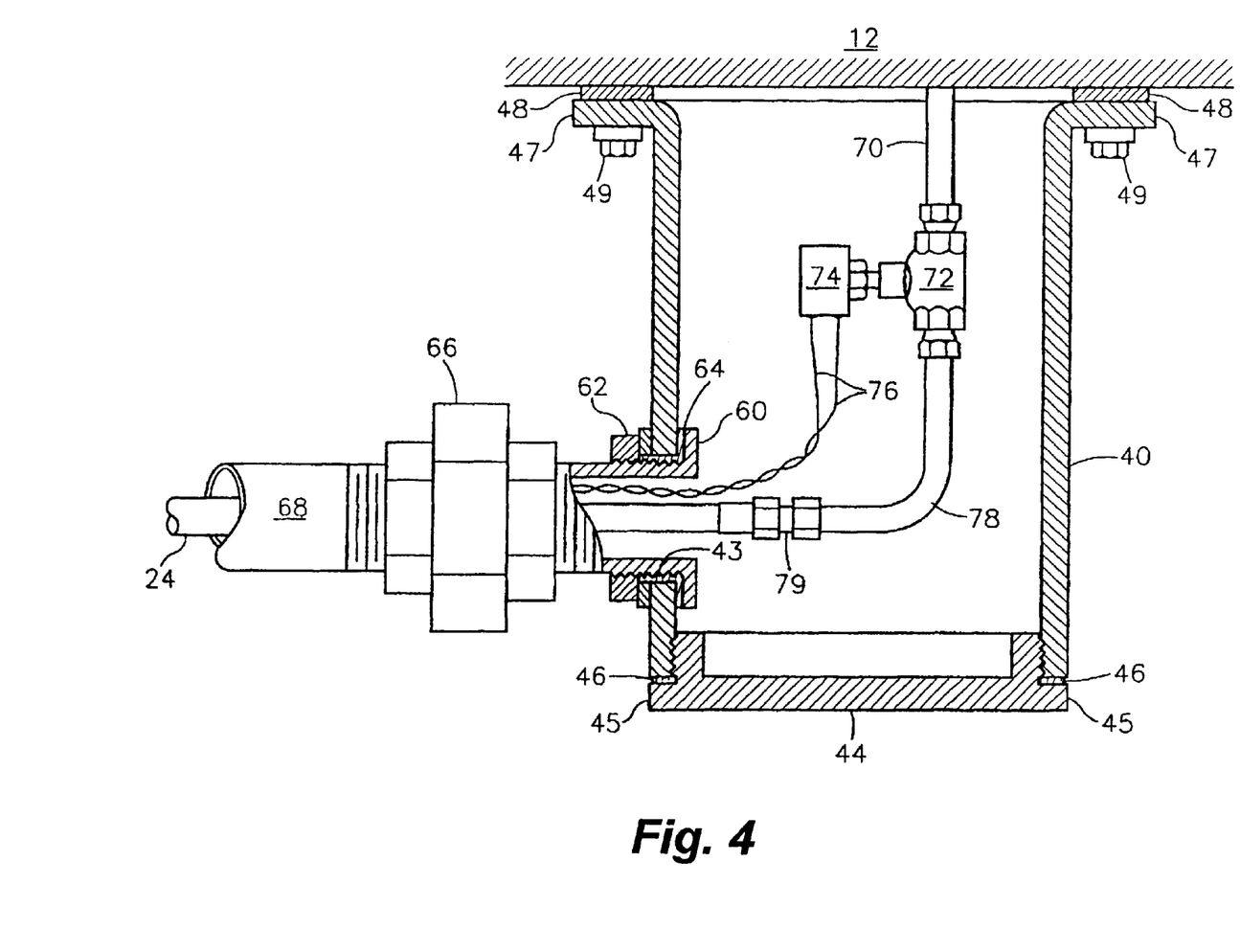

In the example of the penetration housing 40 for the suction conduit 24 shown best by FIG. 4, the housing body is a flanged cylinder that is secured tightly against the load tap changer case 12 by the clamping pressure of machine screws 49 compressing a gasket 48 into the opposite faces of the load tap changer case and the flange 47. At the other or bottom end of the flanged cylinder, the open cylinder bore is closed by the flange 45 of a threaded plug 44 compressing a ring gasket 46.

An aperture 43 in the cylinder 40 wall receives a flanged bulkhead nipple 60 which is drawn by a compression nut 62 against a gasket 64, The exterior threaded end of the bulkhead nipple is provided with half of a pipe union 66. The other half of the pipe union 66 is threaded upon a pipe sleeve 68 that completely encloses the pump suction conduit continuously to the cabinet enclosure 30.

Threaded plug 44 provides resealable tool access to the interior of housing 40 while in sealed position against the load tap changer case 12. Within the housing 40, oil flow from the load tap changer through the pipe stub 70 is controlled by an electric solenoid valve 72 energized by winding 74 and conductors 76. A 90° elbow sub 78 connects the valve 72 to the conduit 24 with a tubing union 79.

Figure 3:
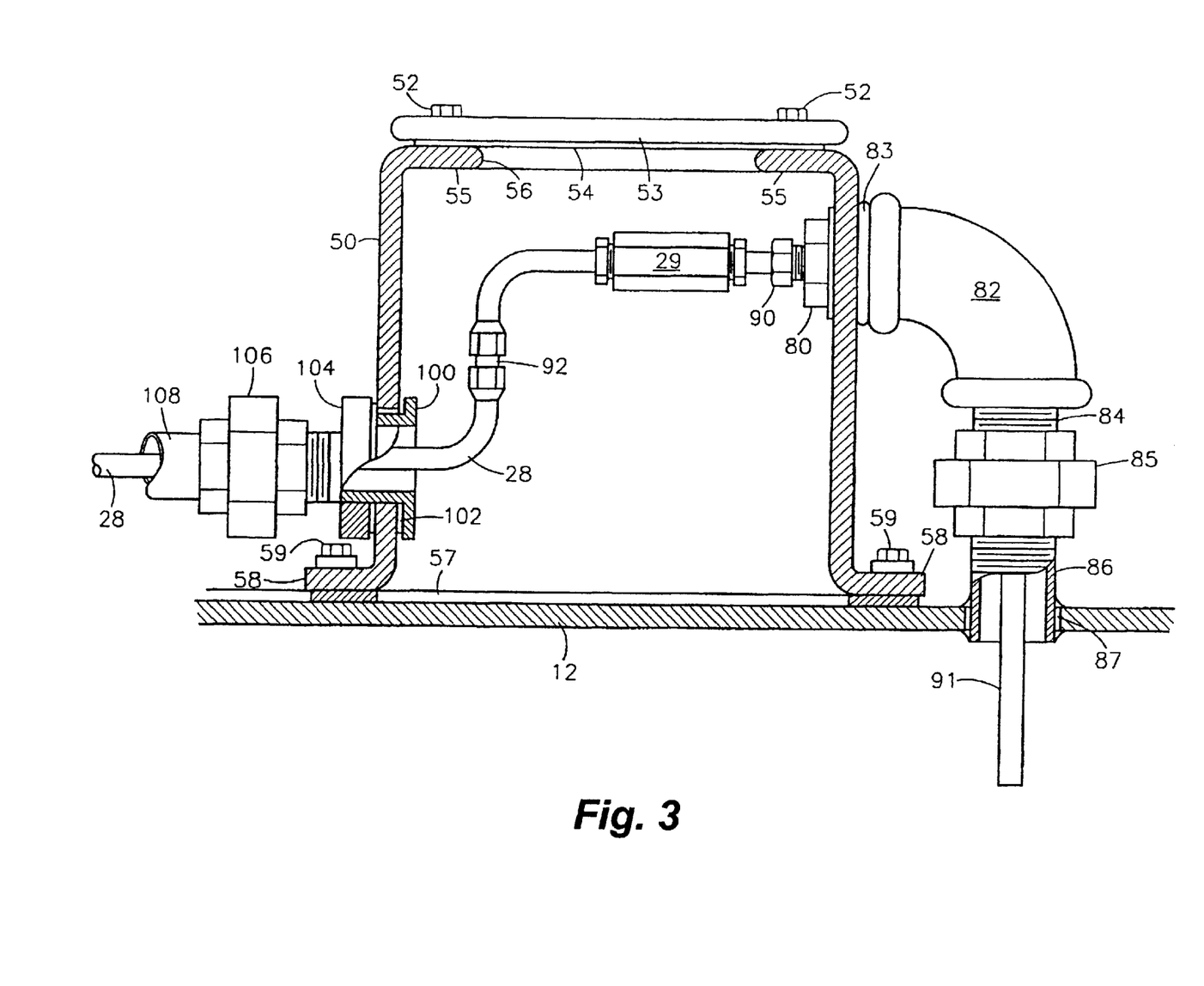
FIG. 3 is a partially sectioned detail of an upper surface connector housing: and, FIG. 4 is a partially sectioned detail of a lower surface connector housing.

Penetration housing 50 of FIG. 3 may have a cylindrical or rectangular sectional form that is secured by machine screws 59 through an integral flange 58 sealed against a gasket 57. Access to the interior of the housing 50 is provided through an end port 56. A cover 53 secured by machine screws 52 against a gasket 54 and an internal flange 55 provides resealable tool access to the interior of the housing 50.

Through one aperture in the wall of housing 50 is a threaded bushing 80 screwed into a 90° ell 82 to compress a gasket or O-ring 83 against the exterior face of housing 50. A nipple 84 connects the 90° ell to half of a pipe union 85. The other half of the union 85 is threaded upon a stub 86 welded into an aperture 87 in the load tap chamber casing. A compression nut 90 threaded into the face of bushing 80 seals and secures a subsection of tubing 91 within the 90° ell 82. An extended tail of the subsection 91 extends through the stub nipple 86 into the load tap changer oil cavity. Within the interior of the housing 50, the subsection 91 is flow connected by union 92 to a terminal end of return conduit 28.

A second aperture through the wall of housing 50 is sealed by a flanged bulkhead nipple 100 compressed against a gasket 102 by a nut 104. The threaded outer end of the nipple 100 receives halt of a union 106. The other half of the union 106 is threaded upon a pipe sleeve 108 that encloses a fluid drain channel around the return conduit 28 between the connector housing 50 and the cabinet 30.

Figure 2:
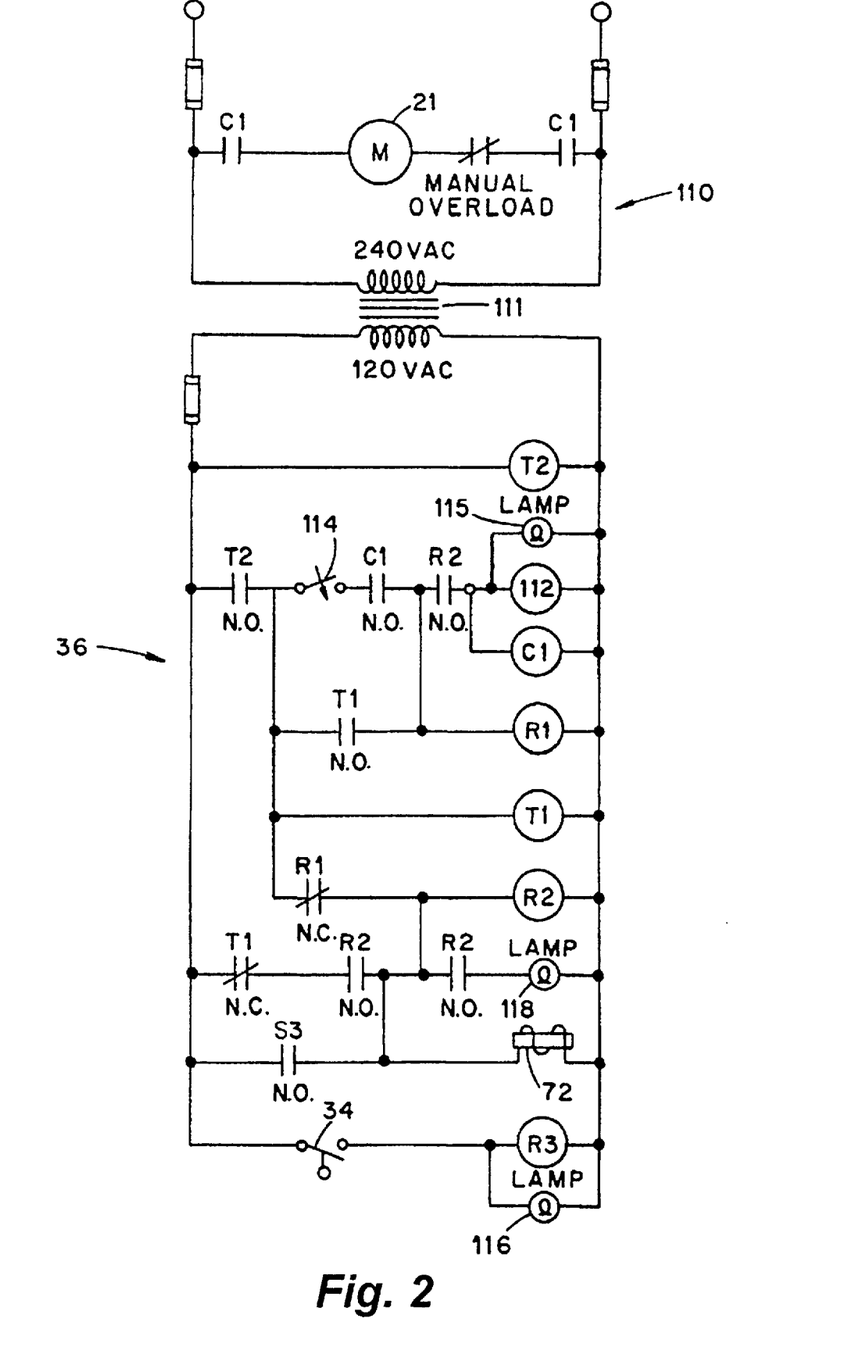
FIG. 2 is an electrical control schematic of the invention.

The pump motor and alarm control shown schematically by FIG. 2 includes a fused, 240 VAC power circuit 110 to energize the pump motor 21 and a voltage reduction transformer 111. on the low voltage side of the transformer 111, is a motor starting control relay C1 which operates to close the power circuit switches C1 and the 120 V circuit switch C1. An operation cycle control timer T2 operates to close the normally open subcircuit switch T2 to energize other control functions in coordination with the load tap changer operation. Load element 112 is a power meter for system management and lamp 115 provides a remote indication of normal motor 21 operation.

Switch 114 is a pressure differential control switch responsive to the pressure drop of pumped insulating oil across the filter unit 22. The control elements of this switch are adjusted to monitor a pressure differential range above a lower threshold and below an upper threshold. When pressure falls below the lower threshold, as in the case of circuit conduit rupture or pump malfunction, the pump motor is disconnected from its energy source. Similarly, when the filter unit 22 is sufficiently loaded to cause the pressure differential across the unit to exceed the upper threshold limit, the pump motor power is disconnected.

An alternative embodiment of the invention may provide an electric clutch connection between the pump 20 and motor 21 whereby the motor runs continuously to drive other units or equipment and a mechanical drive connection between the motor and pump is disengaged.

In the event of leakage from the primary circulation circuit, whether by conduit rupture or faulty connector seal, fluid lost from the primary circuit will flow into the secondary containment volume within the housing 40 and 50, the cabinet 30 and the sleeve conduits 68 and 108, The pump and filter cabinet 30 is positioned elevationally below the load tap changer and the related connector housings 40 and 50. Consequently, significant fluid leakage from the primary circuit will eventually flow by gravity drive into the cabinet sump reservoir 32 thereby activating a signal from the fluid sensor switch 34.

When the fluid sensor 34 in the cabinet reservoir 32 detects the presence of oil in the reservoir due to leakage in the primary circulation circuit, switch 34 will close, energize the relay coil R3 and illuminate the associated lamp 116. With the energization of relay winding R3, switch R3 closes to energize the closure of solenoid valve 72 thereby preventing the drainage of fluid in the primary circuit from the load tap changer cavity. Relay winding R3 might also be employed to actuate external alarms or other systems as a consequence of the fluid sensor 34 signal.

When the valve 72 in the pump suction conduit 24 closes, a continued attempt of the motor 21 to operate pump 20 effects an operation of the pressure differential switch 114 and the general emergency shut down circuitry of relays R1, R2 and the alarm represented by lamp 118. All operating elements of the unit thereafter shut down and a general alarm is transmitted to the remote control center. To start the pump 20 again, a reset protocol must be followed.

Although a preferred embodiment of the invention elevationally positions the sump volume 32 and fluid sensor 34 below the load tap changer connection housings, those of ordinary skill may reverse this alignment and position the pump higher than either of the connector housings. Such may be the case for circulation of insulation oil from the transformer 10 case cavity and the desirability of placing the pump suction housing 40 near the transformer case bottom. Such an elevational reversal of the invention components may be readily accommodated by positioning the fluid sensor 34 within the lowest connector housing or wherever the lowest gravity flow position is in the circulation system.

It also should be noted that more than one fluid sensor 34 may be employed by the invention. For example, parallel connected fluid sensors may also be positioned in both of the connector housings 40 and 50.

Having fully disclosed the preferred embodiments of our invention, those of ordinary skill in the aft may devise obvious equivalencies and alternatives. As our invention, however,

We claim:

1. An apparatus for preventing environmental contamination by leaks of electrical insulation oil from an electric power transmission device having an external oil filtration system, said apparatus comprising the combination of: an insulating oil circulation system having an oil filtration unit and a motor driven circulation pump; a first circulation flow conduit between said filtration unit and an electric power transmission device; a second circulation flow conduit between said pump and said power transmission device; a secondary containment volume enclosing said filtration unit, said pump, said first flow conduit and said second flow conduit; a sump volume having a gravity flow channel connection with said secondary containment volume; and oil sensing means for transmitting a signal in response to the accumulation of insulating oil in said sump volume.

2. An apparatus as described by claim 1 wherein said signal actuates an alarm system.

3. An apparatus as described by claim 1 wherein said signal causes the disconnection of the motor drive for said pump.

4. An apparatus as described by claim 1 wherein said oil circulation system includes a remote operated valve to interrupt oil flow through said circulation system.

5. An apparatus as described by claim 4 wherein said sensing means signal causes said valve to interrupt said oil flow.

6. An apparatus as described by claim 1 wherein said sump volume is elevationally positioned below said secondary containment volume.

7. An apparatus as described by claim 6 wherein said pump, said filtration unit and said sump volume are enclosed within a common cabinet volume.

8. An apparatus as described by claim 1 wherein said secondary containment volume comprises a housing having manual internal accessibility, said housing being secured to a casement surface of said power transmission device and enclosing casement penetration connections of at least one of said circulation flow conduits.

9. An apparatus as described by claim 8 wherein said pump, said filtration unit and said sump volume are enclosed within the volume of a common cabinet.

10. An apparatus as described by claim 9 wherein said flow conduits are enclosed within sleeving conduits between said cabinet and a respective housing.

11. A method of preventing environmental contamination by leaks of electrical insulation oil from an electric power transmission device having an external oil filtration system, said method comprising the steps of:

providing an insulating oil circulation system having an oil filtration unit and a motor driven circulation pump; providing a first circulation flow conduit between said filtration unit and an electric power transmission device; providing a second circulation flow conduit between said pump and said power transmission device; enclosing said pump, said filtration unit, said first flow conduit and said second flow conduit within a substantially fluid-tight secondary containment volume; providing a fluid drain conduit between said secondary containment volume and a fluid sump volume: and, providing an oil sensing means for transmitting a signal responsive to the presence of oil in said sump volume.

12. A method as described by claim 11 wherein said signal actuates an alarm system.

13. A method as described by claim 11 wherein said signal causes a disconnection of the motor drive for said pump.

14. A method as described by claim 11 including the step of interrupting fluid flow within said circulation system responsive to said oil sensing means signal.

15. A method as described by claim 11 including the step of elevationally positioning said sump volume below said secondary containment volume.

16. A method as described by claim 11 including the step of providing reclosable manual accessibility to said circulation system at a point of flow conduit penetration into said transmission device.

17. An apparatus for preventing environmental contamination by leaks of electrical insulation oil from an electric power transmission device having an external oil filtration system, said apparatus comprising the combination of:
> an oil filtration unit, a motor driven circulation pump and oil circulation carrier means connecting said pump and filtration unit with an electric power transmission device, said pump and filtration unit being secured within an oil containment housing above an oil sump volume; and, oil sensing means for sensing the presence of oil in said sump volume and transmitting a signal in response to such sensed oil presence.

18. An apparatus as described by claim 17 wherein said signal actuates an alarm system.

19. An apparatus as described by claim 17 wherein said signal interrupts the motor drive of said circulation pump.

20. An apparatus as described by claim 17 wherein said oil circulation carrier means includes a remote operated valve to interrupt oil flow through said circulation carrier means.

21. An apparatus as described by claim 20 wherein the signal transmitted by said oil sensing means operates said remote valve to interrupt oil flow through said circulation carrier means.

22. An apparatus as described by claim 17 wherein said oil circulation carrier means comprises a signal operated valve responsive to said signal transmitted by said oil sensing means to terminate flow through said circulation carrier means.

23. An apparatus as described by claim 22 wherein said signal transmitted by said oil sensing means also interrupts the motor drive of said circulation pump.

24. A secondary containment system for use with an enclosure within which fluid is contained and wherein the enclosure has an external surface and includes a first conduit through which fluid is routed, the system comprising:
> containment means providing an internal cavity for enclosing at least a portion of the external surface of the enclosure within which fluid is contained and including a second conduit positionable about so as to encompass the first conduit through which fluid is routed so that the containment means prevents flow communication between said portion of the external surface and the surrounding environment and between the first conduit and the surrounding environment, the containment means including a sump reservoir associated with and in flow communication with the internal cavity so that upon leakage of the fluid through the external surface of the enclosure or from the first conduit, the fluid flows to the sump reservoir, and means associated with the sump reservoir for transmitting a signal in response to the accumulation of fluid in the sump reservoir.

25. The system as defined in claim 24 wherein fluid is circulated through the first conduit by means of a pump, and the system further includes means for shutting down the pump upon the accumulation of fluid in the sump reservoir.

26. The system as defined in claim 24 wherein fluid is circulated through the first conduit, and the system further includes means for interrupting the flow of fluid through the first conduit upon the accumulation of fluid in the sump reservoir.

27. The system as defined in claim 24 wherein the signal actuates an alarm system.

28. A system for use with a fluid circulation system having a motor driven circulation pump and fluid conduits through which the fluid is circulated, said system comprising:
> means providing a secondary containment volume enclosing at least a portion of the fluid circulation system and including containment conduits wherein each containment conduit is positionable about so as to encompass a corresponding fluid conduit through which the fluid is circulated so that the secondary containment volume prevents flow communication between said portion of the external surface and the surrounding environment and between each fluid conduit and the surrounding environment, the secondary containment volume including a sump reservoir to which fluid gravitates upon leakage of the fluid from the portion of the fluid circulation system enclosed by the secondary containment volume or from any of the fluid conduits; and, means associated with the sump reservoir for transmitting a signal in response to the accumulation of fluid in the sump reservoir.

29. The system as defined in claim 28 wherein the fluid circulation system is an oil filtration system associated with an electric power transmission device.

30. A system for use with an electric power transmission device having oil filtration apparatus including an oil filtration unit arranged external to the electric power transmission device, a motor-driven circulation pump and at least one oil conduit extending between the oil filtration unit and the electric power transmission device through which oil is conducted between the oil filtration unit and the electric power transmission device, the system comprising:
> means providing a secondary containment volume for enclosing the oil filtration unit, pump and conduits so that the secondary containment volume-providing means prevents flow communication between each of the oil filtration unit, pump and the at least on oil conduit and the surrounding environment, the secondary containment volume including a containment conduit which is positionable about so as to encompass the at least one oil conduit and including a sump reservoir to which oil gravitates upon leakage of oil from the oil filtration apparatus enclosed by the secondary containment volume; and, means associated with the sump reservoir for transmitting a signal in response to the accumulation of oil in the sump reservoir.

31. The system as defined in claim 30 wherein the oil filtration apparatus includes a plurality of oil conduits through which oil is conducted between the oil filtration unit and the electric power transmission device, and the volume providing means includes a containment conduit positionable about so as to encompass a corresponding conduit of the oil filtration apparatus.

32. The system as defined in claim 30 further including means for shutting down the pump upon the accumulation of oil in the sump reservoir.

33. The system as defined in claim 30 further including means for interrupting the flow of oil through the at least one conduit of the oil filtration apparatus upon the accumulation of oil in the sump reservoir.

34. The system as defined in claim 33 wherein the interrupting means includes a valve.

35. The system as defined in claim 30 wherein the signal actuates an alarm system.

36. The system as defined in claim 30 wherein the oil filtration unit, pump and the sump reservoir are enclosed within a single cabinet.

37. The system as defined in claim 30 further including an internally accessible housing supported about and encompassing a portion of the at least one conduit of the oil filtration apparatus and situated adjacent the electric power transmission device for providing access to the portion of the conduit encompassed by the housing.

38. The system as defined in claim 37 wherein the housing is attached to so as to be supportedly secured in position adjacent the electric power transmission device by way of the conduit which includes the conduit portion encompassed by the housing so that the housing is not directly attached to the electric power transmission device.

39. In combination with an oil filtration apparatus for use with an electric power transmission device wherein the oil filtration apparatus includes an oil filtration unit arranged external to the electric power transmission device and a motor-driven circulation pump and at least one conduit extending between the oil filtration unit and the electric power transmission device through which oil is circulated between the oil filtration unit and the electric power transmission device by way of the circulation pump, a secondary containment system comprising:

means providing and internal cavity for enclosing the oil filtration unit, pump and conduits so that the enclosing means prevents flow communication between the oil filtration unit, pump and the at least one conduit and the surrounding environment, the cavity-providing means including a containment conduit which is positioned about so as to encompass the at least one conduit and further including a sump reservoir associated with the internal cavity so that upon leakage of the oil from the oil filtration apparatus enclosed by the internal cavity, the oil flows to the sump reservoir; and, means associated with the sump reservoir for transmitting a signal in response to the accumulation of oil in the sump reservoir.

* * * * *